United States Patent
Kim

(10) Patent No.: US 7,353,110 B2
(45) Date of Patent: Apr. 1, 2008

(54) CAR NAVIGATION DEVICE USING FORWARD REAL VIDEO AND CONTROL METHOD THEREOF

(75) Inventor: Seung-Il Kim, Seoul (KR)

(73) Assignee: DVS Korea Co., Ltd., Kyunggi-Do (KR)

(*) Notice: Subject to any disclaimer, the term of this patent is extended or adjusted under 35 U.S.C. 154(b) by 777 days.

(21) Appl. No.: 10/841,237

(22) Filed: May 7, 2004

(65) Prior Publication Data

US 2005/0182564 A1 Aug. 18, 2005

(51) Int. Cl.
*G01C 21/30* (2006.01)
*G01C 21/32* (2006.01)

(52) U.S. Cl. ............... 701/211; 701/208; 701/210; 340/995.1; 340/995.24

(58) Field of Classification Search ............. 701/211; 345/629, 632, 641, 630; 340/995.1, 995.24
See application file for complete search history.

(56) References Cited

U.S. PATENT DOCUMENTS

| 4,866,626 | A | 9/1989 | Egli |
| 6,023,290 | A | 2/2000 | Seita |
| 2003/0132939 | A1 | 7/2003 | Moshe et al. |
| 2003/0220736 | A1 | 11/2003 | Kawasaki |
| 2003/0234859 | A1 | 12/2003 | Malzbender et al. |

OTHER PUBLICATIONS

Video motion representation for improved content access, Jeannin, S.; Mory, B.; Consumer Electronics, IEEE Transactions on vol. 46, Issue 3, Aug. 2000 pp. 645-655, Digital Object Identifier 10.1109/30.883425.*

An augmented virtual reality interface for assistive monitoring of smart spaces, Ou, S.; Karuppiah, D.R.; Fagg, A.H.; Riseman, E.; Pervasive Computing and Communications, 2004. PerCom 2004. Proceedings of the Second IEEE Annual Conference on 2004 pp. 33-42, Digital Object Identifier 10.1109/PERCOM.2004.1276843.*

The electronic motorist, Jurgen, R.K.; Spectrum, IEEE, vol. 32, Issue 3, Mar. 1995 pp. 37-48 Digital Object Identifier 10.1109/6.367971.*

Expanding the digital camera's reach, Chandra Narayanaswami; Raghunath, M.T.; Computer, vol. 37, Issue 12, Dec. 2004 pp. 65-73, Digital Object Identifier 10.1109/MC.2004.243.*

* cited by examiner

*Primary Examiner*—Cuong Nguyen
(74) *Attorney, Agent, or Firm*—Greenlee, Winner, and Sullivan, P.C.

(57) ABSTRACT

A car navigation device using a forward real video and a control method thereof are disclosed. The car navigation device using a forward real video along the travel direction of a vehicle, comprises a camera that photographs the forward real video and outputs the photographed video on a screen, a GPS receiver that receives current position information of the vehicle from a satellite, and a navigation main module that receives the current position information of the vehicle from the GPS receiver, obtains more accurate current position information through calibration using a speed sensor and a gyro, extracts TBT information based on the obtained accurate current position information and user's set destination point information by a general method, and overlays the TBT information on the screen containing the forward real video along the direction of a destination point.

9 Claims, 6 Drawing Sheets

FIG. 4
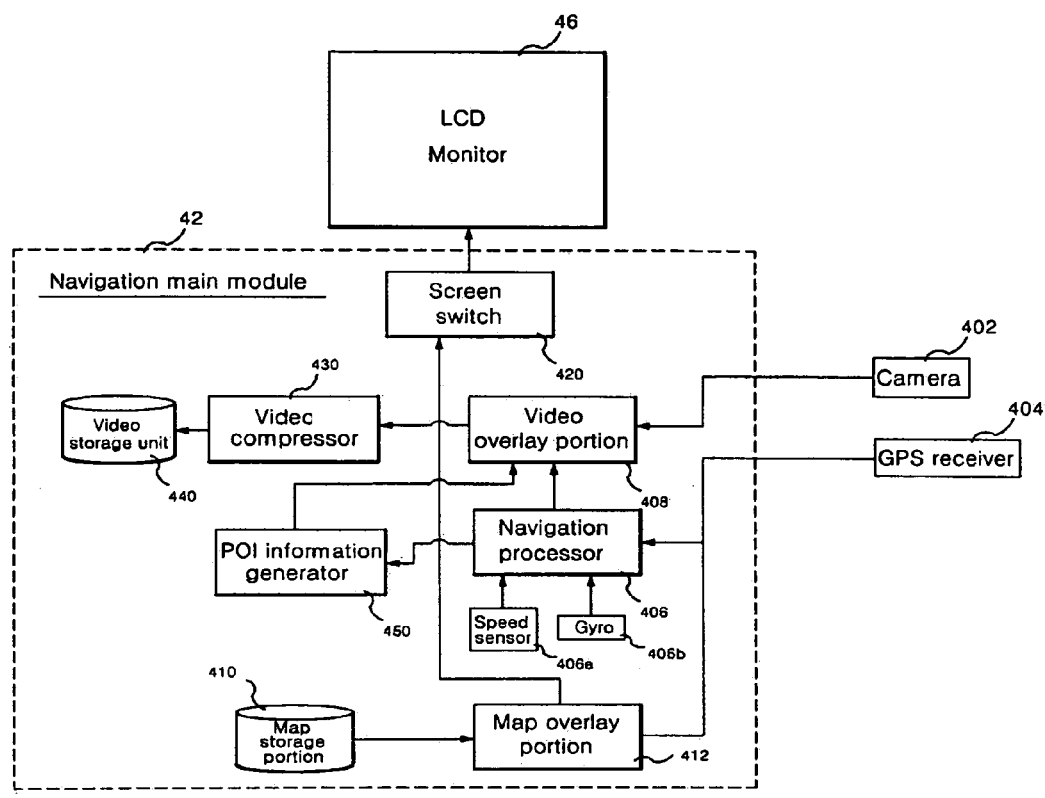
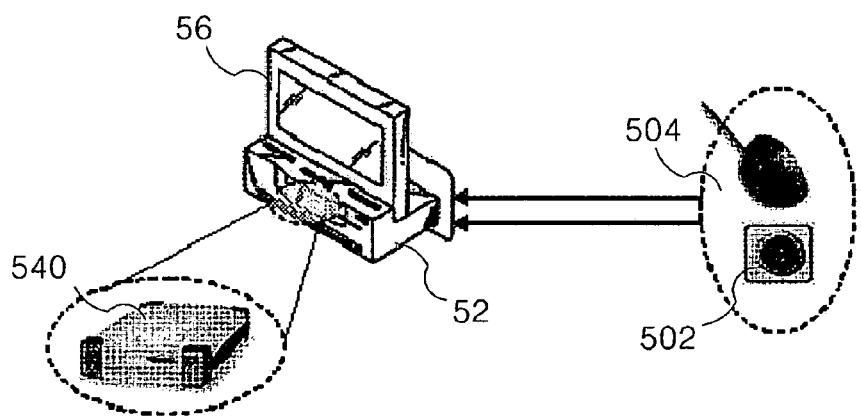
FIG. 5

CAR NAVIGATION DEVICE USING FORWARD REAL VIDEO AND CONTROL METHOD THEREOF

CROSS REFERENCE TO RELATED APPLICATIONS

This application claims priority from Korean Application No. 10-2004-0009748, filed Feb. 13, 2004, which is incorporated herein in its entirety, by reference.

BACKGROUND OF THE INVENTION

1. Field of the Invention

The present invention relates to a car navigation device, and more particularly, to a car navigation device which provides a user with a forward real video-based navigation service using a forward real video photographed by a camera installed forward along the travel direction of a vehicle and a position information obtained from a GPS receiver, and, thereby minimizing the user distraction or anxieties due to confused information.

2. Description of the Related Art

A global positioning system (GPS) is a position determination system using artificial satellites. A GPS receiver receives electromagnetic wave transmitted from a known satellite, and obtains the position of an observation point from measured data of a time required until the electromagnetic wave reaches the observation point. The GPS is composed of a space section, a terrestrial section and a user section.

Since the position determination of the GPS is based on the four-dimensional coordinates positioning system using three-dimensional coordinates of an observation point, i.e., (X, Y, Z) and a time (t), the GPS can be effectively used that determining the position and velocity of an object traveling at high speed, such as an aircraft, a ship or a vehicle. Also, the GPS is advantageous in that observation can be made at any given time, and data is obtained in several seconds. A NAVSTAR (NAVigation Satellite Timing And Ranging) satellite, which was developed originally for military use by the United States Government, has been used as a GPS satellite. Since 1988, three satellites with orbital time intervals of 0.5 sidereal day, i.e., approximately, 11 hours and 58 minutes, have been substantially uniformly placed around each of six circular orbits, each being 20,183 km high from the land, being inclined at an angle of 55° relative to the equator and being separated from each other by multiples of 60° longitude, thereby enabling positioning from at least four satellites at any place of the world.

As to the accuracy levels achievable by using the GPS system, there are two types of signals available from the GPS satellite: an L1 signal; and an L2 signal. The first type of signal, i.e., L1 signal, includes both a C/A (Clear Acquisition) code for low accuracy data, and a P (Precision or Protection) code for high-accuracy data. The second type of signal, i.e., L2 signal, is modulated by only the P code.

Specifically, the L1 signal using the C/A code is only open for public use, while use of the P code is limited to military purposes by the agreement among governments concerned. A large portion of the satellite track errors, causing a positioning error, referred to as selective availability (SA) was purposefully induced by the U.S. Department of Defense to limit GPS accuracy to citizen applications, to a level of about 100 m. However, the recent technological development and proliferation of the GPS applications has urged the U.S. government to promulgate abolition of the SA in May 2000, leading to a considerable reduction in positioning error rate.

A conventional car navigation device includes a GPS receiver that receives position information of a vehicle during travel from a satellite, a map data storage device that provides map information about an area where the vehicle travels, a central processor unit (CPU) that processes position information and map information, and a display that displays a destination point, current position, and so on, and route controller that enables a user to arrive at his/her destination point in an ensured manner. The car navigation device, which is mounted on a vehicle, displays the current position and route information on the basis of the user's input information for destination point.

In the conventional car navigation device, navigation functions encompass dead reckoning, map matching, and GPS. The dead reckoning obtains the trip trajectory and relative position of a vehicle using a bearing sensor and a distance sensor mounted on the vehicle. The map matching compares the trip trajectory obtained by dead reckoning with a road based on map data to determine a transit road, thereby obtaining a map position of the vehicle. Korean Laid-open Patent Publication No. 2001-0024811 discloses a car navigation system which can increase the level of navigation accuracy by matching the position of a vehicle obtained by map matching with the absolute position of the vehicle, e.g., latitude and longitude information of the vehicle, obtained by GPS.

As shown in FIG. 1, the conventional car navigation device displays the current position of a vehicle on a two-dimensional plane map presented by a graphic image around a user's intended route to provide the user with information for the travel direction. The conventional car navigation device, however, provides a user with only the information about the travel direction of the car, rather than a real environment of a road on which the car is driving, making it difficult for a driver to find a correct road when the driver is new to the area or when the road is confusingly disorderly made.

To address the above problem, as shown in FIG. 2, another conventional car navigation device has been proposed in which surrounding environment 202, 204 is presented in a three-dimensional manner to be conformable to a real environment to provide travel route guidance to a user in a more user-friendly manner.

However, the conventional car navigation device has several disadvantages that the amount of map data to be offered to the user has become excessively large, requiring an increased production cost, and updating data of real road environments is retarded. Also, since the graphic image displayed on a screen of a monitor is in units of prominent buildings or roadside landmarks, finely-tuned environment data cannot be provided to the driver, which may make the guidance rough.

Further, in the conventional car navigation device, even when a turn-by-turn (TBT) information 304 saying as "Go straight ahead to a viaduct" is displayed on a predetermined region of the screen of a graphic map 302 for displaying the trip route, as shown in FIG. 3, it is often the case that the viaduct cannot be accurately located.

SUMMARY OF THE INVENTION

The present invention provides a car navigation device with a forward real video-based navigation service using a forward real video photographed by a camera installed forward along the travel direction of a vehicle and a position information obtained from a GPS receiver, and, thereby minimizing the user distraction or anxieties due to confused information.

In an aspect of the present invention, there is provided a car navigation device using a forward real video along the travel direction of a vehicle, comprising: a camera that photographs the forward real video and outputs the photographed video on a screen; a GPS receiver that receives current position information of the vehicle from a satellite; and a navigation main module that receives the current position information of the vehicle from the GPS receiver, obtains more accurate current position information through calibration using a speed sensor and a gyro, extracts TBT information based on the obtained accurate current position information and user's set destination point information by a general method, and overlays the TBT information on the screen containing the forward real video along the direction of a destination point.

In a preferred embodiment of the present invention, the navigation main module receives the current position information of the vehicle from the GPS receiver, obtains more accurate current position information through calibration using a speed sensor and a gyro, extracts TBT information by a general method based on the obtained accurate current position information and user's set destination point information, divides the TBT information with respect to the forward real video by traffic lane, and overlays the divided TBT information at locations divided by traffic lane on the screen containing the forward real video along the direction of a destination point.

In another preferred embodiment of the present invention, the navigation main module may comprises: a navigation processor that receives the current position information of the vehicle from the GPS receiver, obtains more accurate current position information through calibration using a speed sensor and a gyro, extracts TBT information by a general method based on the obtained accurate current position information and user's set destination point information; and a video overlay portion that overlays the TBT information at position on the screen containing the forward real video along the direction of the destination point.

The navigation main module may further comprise a POI information generator that extracts position information of a destination building from the screen and outputs the same as POI information, and the video overlay portion preferably overlays the POI information output from the POI information generator on a location on the forward real video corresponding to the position of the destination building, to then be displayed.

Also, the car navigation device may further comprise a video compressor that compresses the photographed video supplied from the camera during travel; and a video storage unit that stores compressed video data.

The car navigation device may further comprise: a map storage unit that stores graphic map information; a map overlay portion that overlays the current position information of the vehicle supplied from the GPS receiver on the graphic map information; and a screen switch that switches screens upon user's optional setting as to whether only the video overlaid by the video overlay portion is to be displayed, or the video overlaid by the map overlay portion is to be displayed together with the video overlaid by the video overlay portion.

Preferably, the camera and the GPS receiver are integrally formed.

In another aspect of the present invention, there is provided a control method of a car navigation device using a forward real video, comprising the steps of: (a) photographing a forward real video along the travel direction of a vehicle and outputting the photographed video; (b) receiving current position information of the vehicle from a satellite; and (c) receiving the current position information of the vehicle from the GPS receiver, obtaining more accurate current position information through calibration using a speed sensor and a gyro, extracting TBT information based on the obtained accurate current position information and user's set destination point information by a general method, and overlaying the TBT information on the screen containing the forward real video along the direction of a destination point; and (d) dividing the TBT information with respect to the forward real video by traffic lane, and overlaying the divided TBT information at locations divided by traffic lane on the screen containing the forward real video along the direction of a destination point.

Also, the control method may further comprise (e) extracting position information about a destination building from the screen, which is optionally set by a user, outputting the same as POI information, and overlaying the POI information output from the POI information generator on a location on the forward real video corresponding to the position of the destination building.

BRIEF DESCRIPTION OF THE DRAWINGS

The above aspect and advantages of the present invention will become more apparent by describing in detail preferred embodiments thereof with reference to the attached drawings in which:

FIG. 4 is a block diagram of a car navigation device according to the present invention;

FIG. 5 is a perspective view schematically showing the structure of the car navigation device shown in FIG. 4;

DETAILED DESCRIPTION OF THE INVENTION

Figure 1:
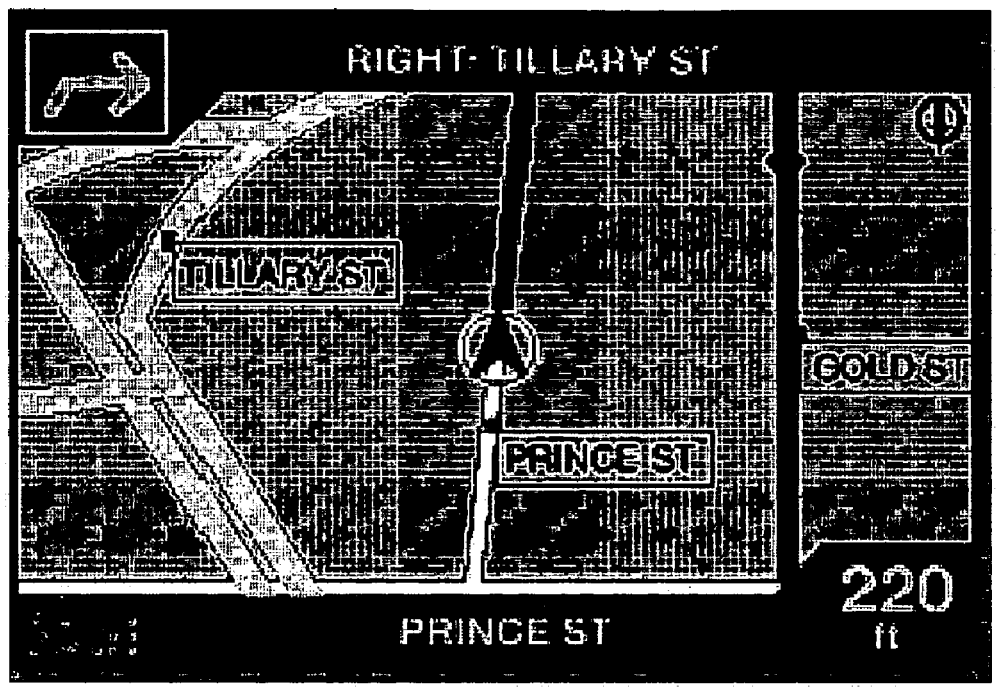
FIGS. 1 and 2 show examples of navigation screens displayed by a conventional car navigation device.
Figure 2:
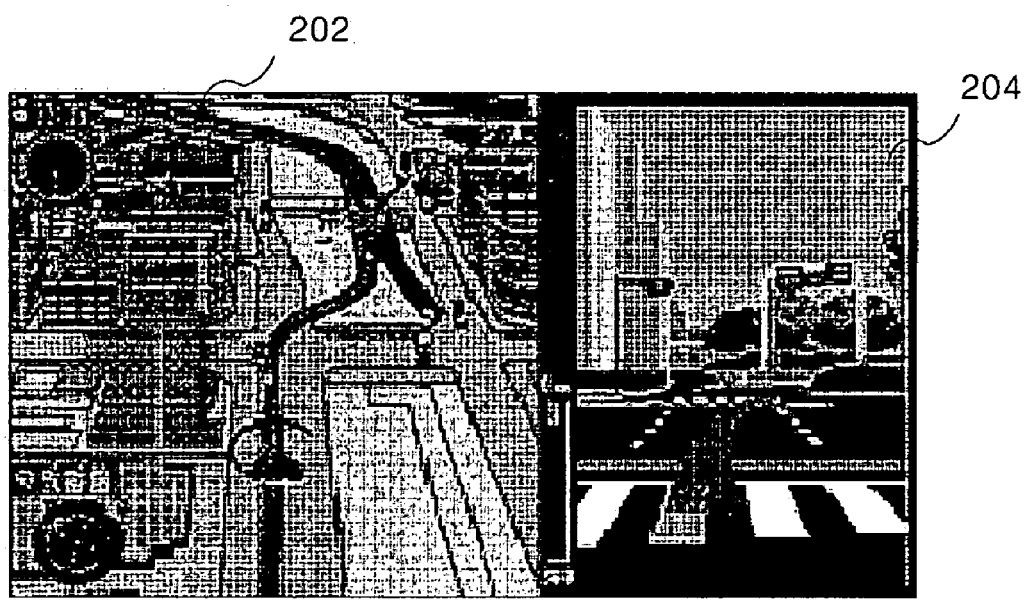
Figure 3:
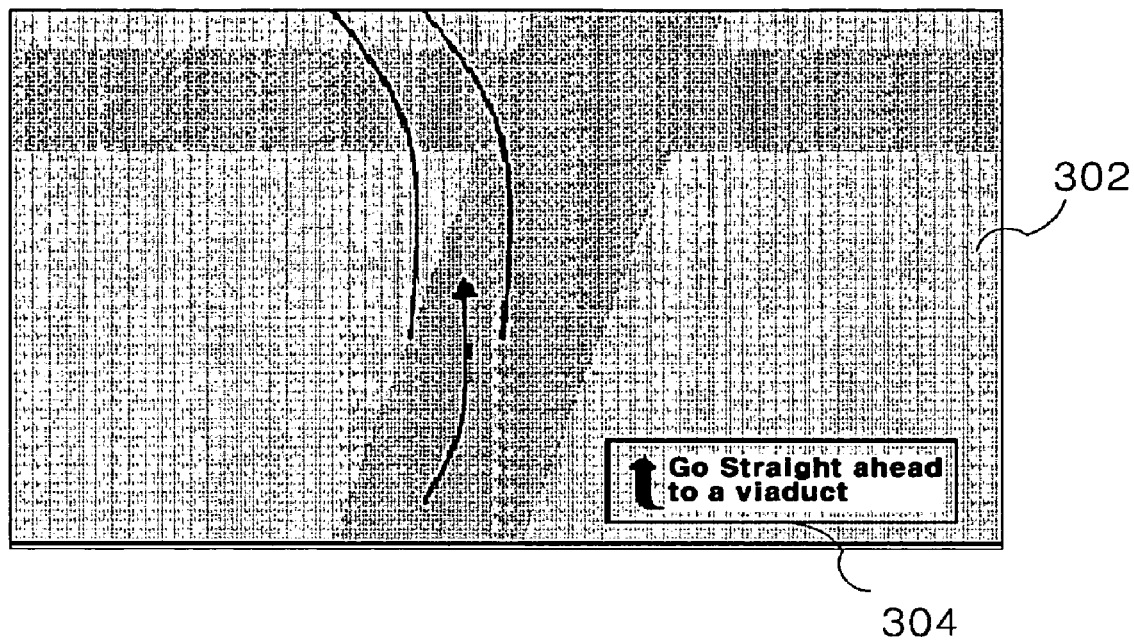
FIG. 3 is a diagram for explaining a drawback associated with the conventional car navigation device.

In general the terms and phrases used herein have their art-recognized meaning, which can be found by reference to standard texts, journal references and contexts known to those skilled in the art.

Preferred embodiments of the present invention will now be described in more detail with reference to the accompanying drawings.

FIG. 4 is a block diagram of a car navigation device according to the present invention. Referring to FIG. 4, the car navigation device according to the present invention includes a camera 402, a GPS receiver 404 and a navigation main module 42.

The camera 402 photographs a forward real video along the travel direction of the vehicle and outputs the photographed video on a screen. The GPS receiver 404 receives current position information of the vehicle from a satellite. The a navigation main module 42 receives the current position information of the vehicle from the GPS receiver 404, obtains more accurate current position information through calibration using a speed sensor 406a and a gyro 406b, extracts TBT information based on the obtained accurate current position information and user's set destination point information by a general method, and overlays the TBT information on the screen containing the forward real video along the direction of a destination point.

The car navigation device according to the present invention performs car navigation using the forward real video obtained from the camera 402 installed ahead of the vehicle and the position information obtained by the GPS receiver 404. Thus, a difference between real environment and virtual data can be completely removed without causing user distraction or anxiety due to a discrepancy between a virtual graphic map and real environment, which frequently occurs to the graphically presented navigation service.

FIG. 5 is a perspective view schematically showing the structure of the car navigation device shown in FIG. 4. Referring to FIG. 5, the car navigation device includes a camera 502, a GPS receiver 504, a navigation main module 52, a liquid crystal display (LCD) monitor 56, and a storage unit 540.

The camera 502 photographs a forward real video along the travel direction of the vehicle and outputs the photographed video on a screen. The GPS receiver 504 receives current position information of the vehicle from a satellite. The navigation main module 52 overlays the TBT information on the screen containing the forward real video along the direction of a destination point. The liquid crystal display (LCD) monitor 56 displays overlaid video data. The storage unit 540 stores compressed video data.

Figure 6:
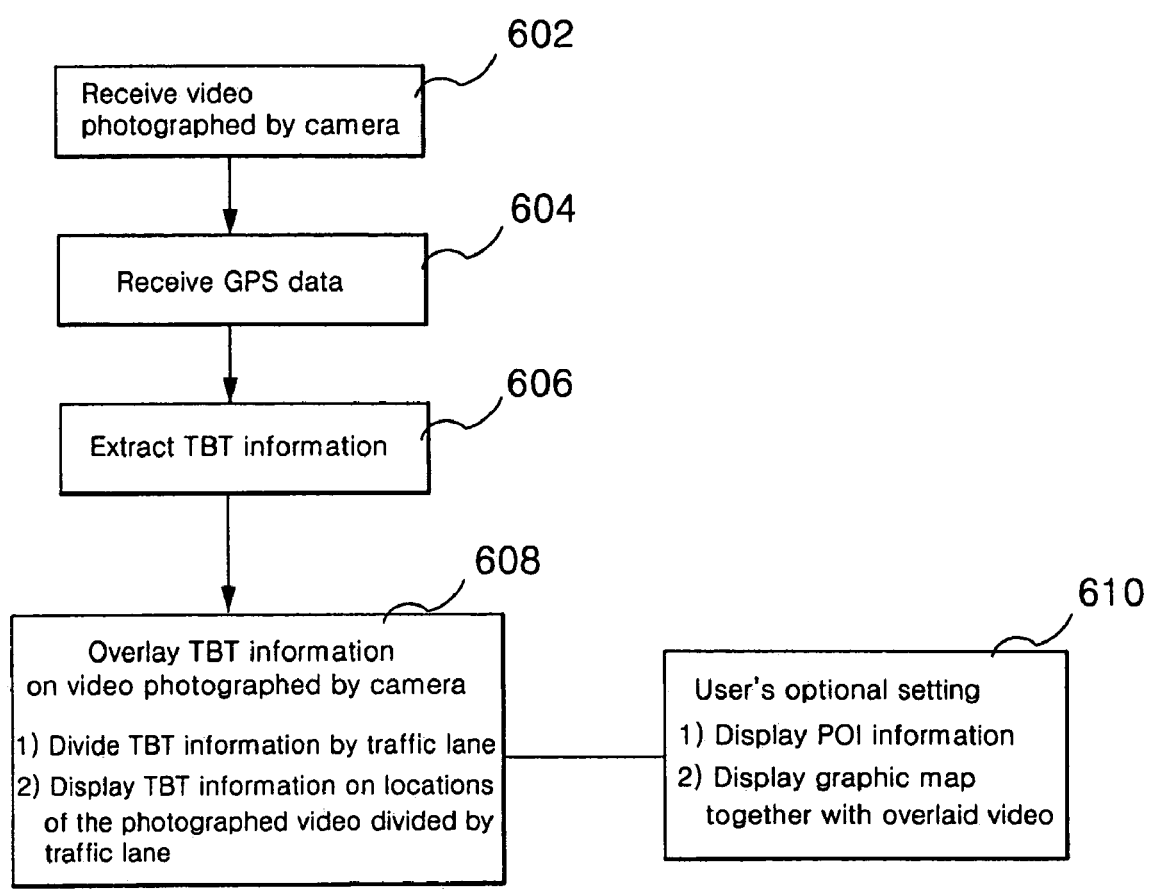
FIG. 6 is a flow diagram showing a control procedure used in the car navigation device according to the present invention.
Figure 7:
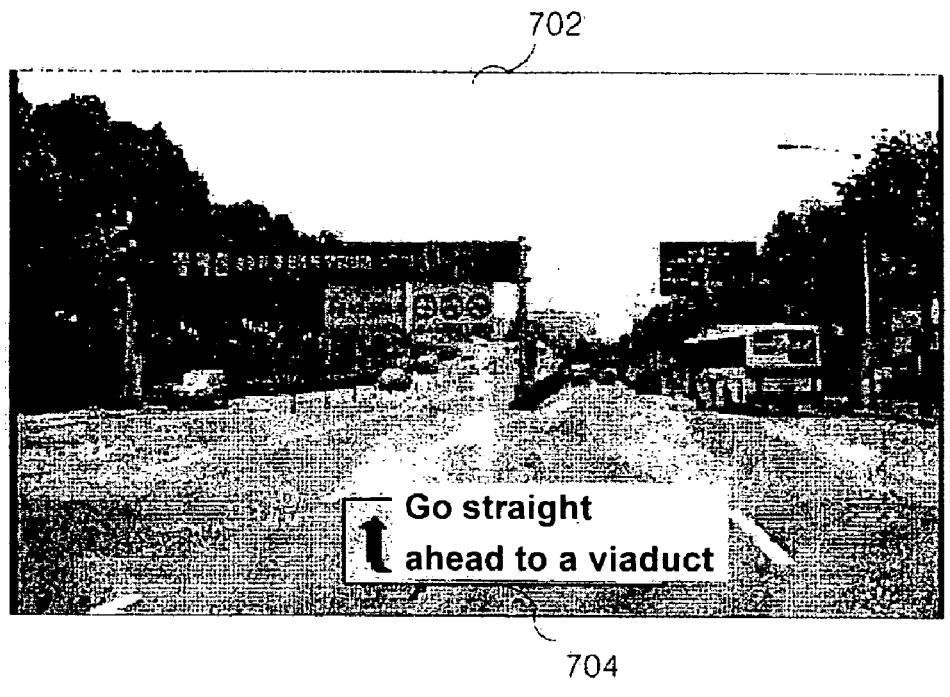
FIGS. 7 and 8 show exemplary screens for explaining the operation of the car navigation device according to the present invention.

Referring back to FIG. 4, various components of the navigation main module 42 will now be described in detail. FIG. 6 is a flow diagram showing a control procedure used in the car navigation device according to the present invention, which will often be referred to in the description that follows.

First, the camera 402 photographs a forward real video along the travel direction of the vehicle to output the photographed video to the LCD monitor 46, and the GPS receiver 404 receives current position information of the vehicle, which is to be referred to as GPS data, from a satellite. That is, the photographed video is received in step 602, and GPS data is received in step 604, as shown in FIG. 6.

A navigation processor 406 receives the current position information of the vehicle from the GPS receiver 404, obtains more accurate current position information through calibration by the speed sensor 406a and the gyro 406b, and extracts TBT information based on the obtained accurate current position information and user's set destination point information by a general method. A video overlay portion 408 overlays the TBT information on locations divided by traffic lane on the screen containing the forward real video along the direction of the destination point to display the same on the LCD monitor 46. That is, the TBT information is overlaid on the video photographed by the camera 503, which is divided by traffic lane to then be displayed on the LCD monitor 46, in step 608. Here, POI (Point-Of-Interest) information may be optionally displayed or graphic map maybe displayed together with overlaid video according to user's optional setting, in step 610. As shown in 7, since the TBT information is overlaid on the forward real video 702 of the vehicle on the screen and the overlaid TBT information 704 is separately provided by traffic lane, substantially no user distraction or anxiety is caused.

Figure 9:
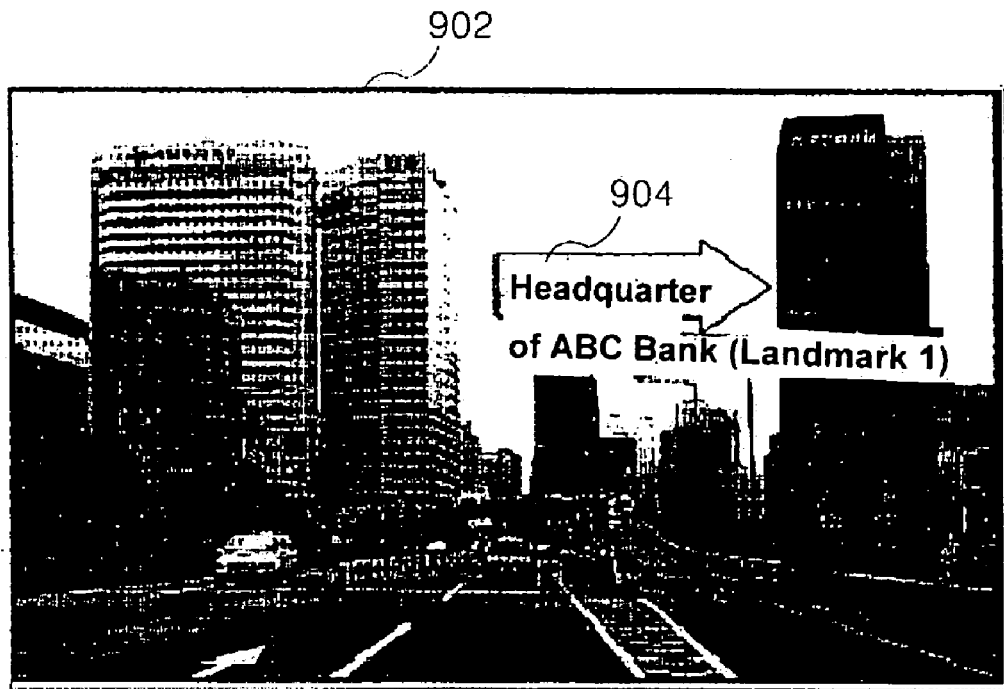
FIG. 9 shows an exemplary screen for explaining the display operation of the car navigation device using point-of-interest (POI) information.

A POI information generator 450 extracts position information about a destination building from the screen, which is optionally set by a user, and outputs the same as POI information. The video overlay portion 408 overlays the POI information 904 output from the POI information generator 450 on a location on the forward real video 902 corresponding to the position of the destination building, to then be displayed, as shown in FIG. 9. That is to say, according to the present invention, the user may optionally display the POI information on the real video of a destination point to be directly mapped with a video of an actual building, suggesting that the present invention is implemented in a user-friendly manner.

A video compressor 430 compresses forward video data input from the camera 402 during travel, and a video storage unit 440 stores compressed video data.

The video compressor 430 and the video storage unit 440 may be incorporated into the navigation main module 42 to store the acquired forward video data, as shown in FIG. 4. Otherwise, the acquired forward video data may be stored in an external digital storage medium such as a hard disk, a flash memory or an optical memory disk, which is detachably connected to the navigation main module 42. The storing capability of the navigation main module 42 enables the data stored therein to be used as evidence concerning a traffic accident, if any.

A map storage unit 410 stores graphic map information. A map overlay portion 412 overlays the current position information of the vehicle supplied from the GPS receiver 404 on the graphic map information.

A screen switch 420 switches screens upon user's optional setting as to whether only the video overlaid by the video overlay portion 408 is to be displayed, or the video overlaid by the map overlay portion 412 is to be displayed together with the video overlaid by the video overlay portion 408.

Figure 8:
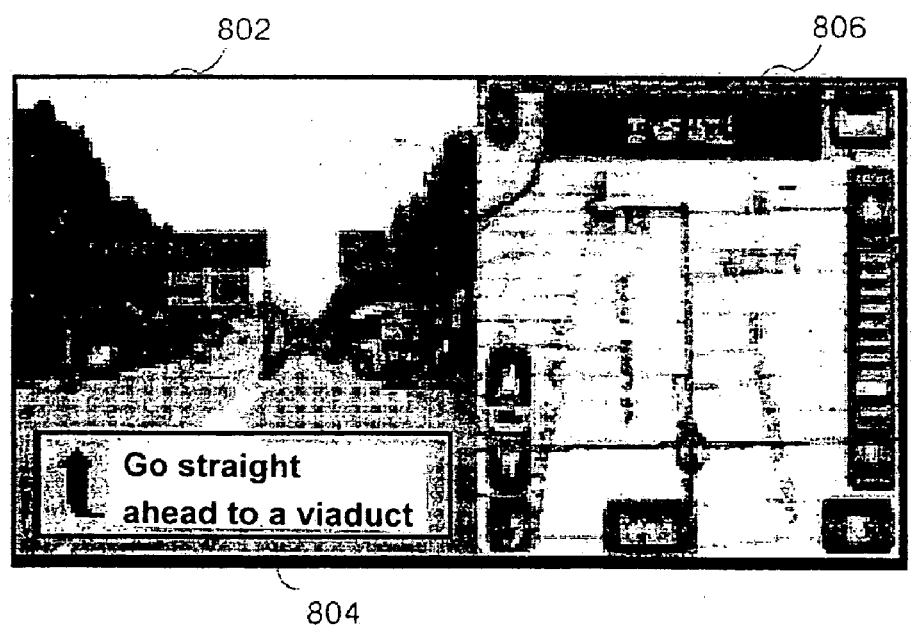

If the user set that the video overlaid by the map overlay portion 412 is to be displayed together with the video overlaid by the video overlay portion 408, video 802 having TBT information 804 overlaid thereon by the video overlay portion 408 is displayed on the LCD monitor together with the video 806 overlaid by the map overlay portion 412, as shown in FIG. 8.

Since the car navigation device according to the present invention also provides a full color map, which has been conventionally graphically presented, realistic car navigation can be provided and a user can obviously grasp the extent of the progress of the vehicle over the overall travel route.

Figure 10:
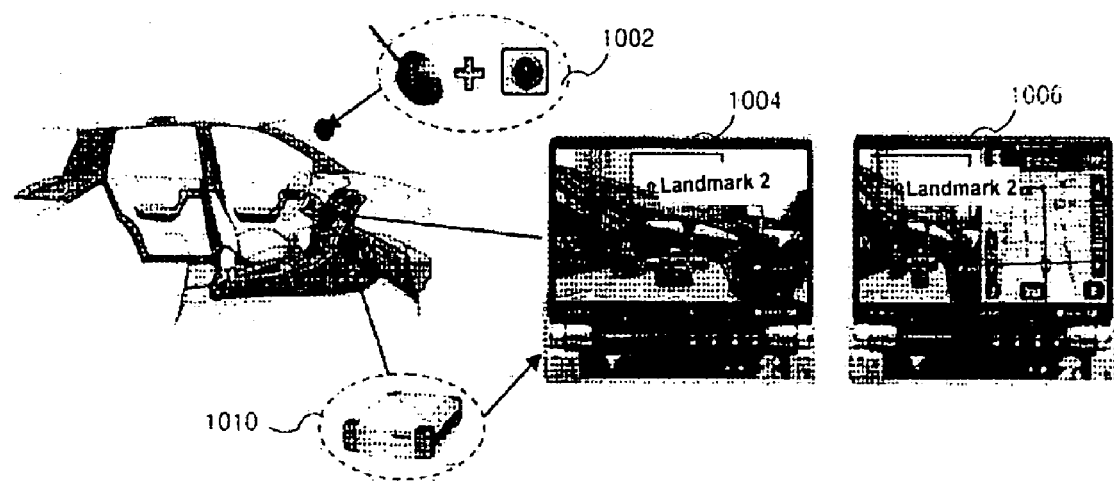
FIG. 10 is a diagram showing a state in which the car navigation device according to the present invention.

FIG. 10 is a diagram showing a state in which the car navigation device according to the present invention. Referring to FIG. 10, the car navigation device according to the present invention includes an on-vehicle GPS receiver 1002 having a camera and a GPS receiver integrally formed therein. Only an image having TBT information overlaid on a video photographed by the camera, which is referred to as a video overlaid image, may be output, as defined by reference numeral 1004 in FIG. 10. Otherwise, video overlaid on a graphic map may also be displayed together with the video overlaid image, as defined by reference numeral

1006. The forward real video data along the travel direction of the vehicle is compressed and stored in a storage unit 1010.

The car navigation device according to the present invention performs car navigation using the forward real video obtained from a camera installed ahead of the vehicle and the position information obtained by a GPS receiver. Thus, a difference between real environment and virtual data can be completely removed without causing user distraction or anxiety due to a discrepancy between a virtual graphic map and real environment, which frequently occurs to the graphically presented navigation service.

Also, the user can optionally display the POI information on the real video of a destination point to be directly mapped with a video of an actual building, suggesting that the present invention is implemented in a user-friendly manner. Further, since the forward real video data is compressed and stored in the storage unit 1010, it can be effectively used as evidence concerning a traffic accident, if any.

According to the present invention, realistic car navigation can be provided and the extent of the progress of the vehicle over the overall travel route can be obviously grasped at a glance, by additionally providing a full color map, which has been conventionally graphically presented.

As described above, according to the present invention, car navigation is performed using the forward real video obtained from a camera installed ahead of the vehicle and the position information obtained by a GPS receiver. Also, a difference between real environment and virtual data can be completely removed without causing user distraction or anxiety due to a discrepancy between a virtual graphic map and real environment, which frequently occurs to the graphically presented navigation service. Further, the user can optionally display the POI information on the real video of a destination point to be directly mapped with a video of an actual building, which is a user-friendly manner. Also, since the forward real video data is compressed and stored in the storage unit 1010, it can be effectively used as evidence concerning a traffic accident, if any. Also, in the car navigation device according to the present invention, realistic car navigation can be provided and the extent of the progress of the vehicle over the overall travel route can be obviously grasped at a glance, by additionally providing a full color map, which has been conventionally graphically presented.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the invention is to be limited only to the claims except as precluded by the prior art. Moreover, the invention as disclosed herein, may be suitably practiced in the absence of the specific elements which are disclosed herein.

What is claimed is:

1. A car navigation device using a forward real video along the travel direction of a vehicle, comprising:
    a camera that photographs the forward real video and outputs the photographed video on a screen;
    a GPS receiver that receives current position information of the vehicle from a satellite; and
    a navigation main module that receives first current position information of the vehicle from the GPS receiver, obtains more accurate current position information than the first current position information through calibration using a speed sensor and a gyro, extracts TBT information based on the obtained more accurate current position information and user's set destination point information, and overlays the TBT information on the screen containing the forward real video along the direction of a destination point.

2. The car navigation device of claim 1, wherein the navigation main module receives the current position information of the vehicle from the GPS receiver, obtains more accurate current position information through calibration using a speed sensor and a gyro, extracts TBT information based on the obtained accurate current position information and user's set destination point information, divides the TBT information with respect to the forward real video by traffic lane, and overlays the divided TBT information at locations divided by traffic lane on the screen containing the forward real video along the direction of a destination point.

3. The car navigation device of claim 2, wherein the navigation main module comprises:
    a navigation processor that receives the current position information of the vehicle from the GPS receiver, obtains more accurate current position information through calibration using a speed sensor and a gyro, extracts TBT information based on the obtained accurate current position information and user's set destination point information; and
    a video overlay portion that overlays the TBT information at position on the screen containing the forward real video along the direction of the destination point.

4. The car navigation device of claim 3, wherein the navigation main module further comprises a POI information generator that extracts position information of a destination building from the screen and outputs the same as POI information, and wherein the video overlay portion overlays the POI information output from the POI information generator on a location on the forward real video corresponding to the position of the destination building, to then be displayed.

5. The car navigation device of claim 4, further comprising:
    a video compressor that compresses the photographed video supplied from the camera during travel; and
    a video storage unit that stores compressed video data.

6. The car navigation device of claim 1, further comprising:
    a map storage unit that stores graphic map information;
    a map overlay portion that overlays the current position information of the vehicle supplied from the GPS receiver on the graphic map information; and
    a screen switch that switches screens upon a user's optional setting as to whether only the video overlaid by the video overlay portion is to be displayed, or the video overlaid by the map overlay portion is to be displayed together with the video overlaid by the video overlay portion.

7. The car navigation device of claim 1, wherein the camera and the GPS receiver are integrally formed.

8. A control method of a car navigation device of claim 1 using a forward real video, comprising the steps of:
    (a) photographing a forward real video along the travel direction of a vehicle and outputting the photographed video;
    (b) receiving current position information of the vehicle from a satellite; and (c) receiving the current position information of the vehicle from the GPS receiver, obtaining more accurate current position information through calibration using a speed sensor and a gyro, extracting TBT information based on the obtained accurate current position information and user's set destination point information, and overlaying the TBT information on the screen containing the forward real video along the direction of a destination point; and (d) dividing the TBT information with respect to the forward real video by traffic lane, and overlaying the divided TBT information at locations divided by traffic lane on the screen containing the forward real video along the direction of a destination point.

9. The control method of claim 8, further comprising:

(e) extracting position information about a destination building from the screen, which is optionally set by a user, outputting the same as POI information, and overlaying the POI information output from the POI information generator on a location on the forward real video corresponding to the position of the destination building.

* * * * *